United States Patent
Hipp

(10) Patent No.: US 6,710,324 B2
(45) Date of Patent: Mar. 23, 2004

(54) OPTOELECTRONIC DISTANCE MEASURING DEVICE

(75) Inventor: Johann Hipp, Hamburg (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/281,288

(22) Filed: Oct. 25, 2002

(65) Prior Publication Data

US 2003/0080285 A1 May 1, 2003

(30) Foreign Application Priority Data

Oct. 29, 2001 (DE) .......................... 101 53 270

(51) Int. Cl.[7] .................. H01V 40/14; G01V 8/00; H03F 3/00; H03F 17/00; G01C 3/08
(52) U.S. Cl. .................. 250/214 A; 250/214 LA; 250/559.29; 250/214 R; 330/308; 330/59; 356/4.01; 356/5.01
(58) Field of Search ................ 330/59, 308; 250/214 A, 250/559.38, 214 LA, 214 R, 214 LS, 559.29; 356/3, 4.01, 5.01, 5.02–5.08

(56) References Cited

U.S. PATENT DOCUMENTS 4,613,231 A * 9/1986 Wichmann
4,818,099 A * 4/1989 Preikschat
4,939,476 A   7/1990 Crawford
5,003,191 A   3/1991 Boyle et al.
5,949,530 A   9/1999 Wetteborn
6,265,725 B1 * 7/2001 Moll

FOREIGN PATENT DOCUMENTS

DE    4108376 A1   12/1992
DE    4328553 A1   11/1994
DE   19607345 A1    8/1997

* cited by examiner

Primary Examiner—David Porta
Assistant Examiner—David C. Meyer
(74) Attorney, Agent, or Firm—Townsend and Townsend and Crew, LLP

(57) ABSTRACT

An optoelectronic distance measuring device has at least one transmitter unit to transmit pulsed electromagnetic radiation, at least one receiver unit associated with the transmitter unit to receive the reflected radiation and an evaluation unit to determine at least the distance of objects reflecting the transmitted radiation, with a series connection of load resistors being connected after the receiver unit and a separate amplifier being associated with each load resistor to amplify the subsidiary pulse produced at the respective load resistor from an incoming, successively attenuated received pulse.

21 Claims, 1 Drawing Sheet

OPTOELECTRONIC DISTANCE MEASURING DEVICE

BACKGROUND OF THE INVENTION

The invention relates to an optoelectronic distance measuring device comprising at least one transmitter unit to transmit pulsed electromagnetic radiation, at least one receiver unit associated with the transmitter unit to receive the reflected radiation and an evaluation unit to determine at least the distance of objects reflecting the transmitted radiation.

Such devices are generally known and are used, for example, in connection with vehicles to detect the surroundings of the vehicle during travel.

The occurrence of objects with very different reflectivity which result in amplitudes of the received pulses on the receiver unit which vary correspondingly strongly is problematic. A near object of high reflectivity such as a so-called cat's eye or a road boundary post, which is also termed a cooperative target, on the one hand, and a far object of low reflectivity such as a tree or a person in dark clothing, on the other hand, can differ from one another in practice with respect to the intensity, and thus to the received signal amplitude of the radiation reflected by them, by a factor of $10^6$ or more.

A receiver unit which should cover such an extremely wide dynamic range will necessarily overmodulate at high intensities. The width of the received pulses decisive for a distance measurement using a pulse transit time process depends on the amplitude of the received radiation pulses. This relationship can be comparatively uncritical in the non-overmodulated or analog range, i.e. for radiation pulses not exceeding a specific intensity or amplitude, but can result in inaccuracies in the distance determination at high intensities, with such inaccuracies being able to lie in the range of some meters.

In connection with this problem it is know, for example, to use amplifiers with a logarithmic characteristic curve with which large amplitudes can be reproduced in a manner reduced in a logarithmic scale. The deformation of the pulse which takes place here and which can result in inaccuracies in the distance measurement is disadvantageous so that such amplifiers are only suitable for applications without a high accuracy requirement.

SUMMARY OF THE INVENTION

It is the object of the invention, starting from an optoelectronic distance measurement device of the kind initially named, to provide a possibility, in particular with distance determination, to at least reduce such inaccuracies to a minimum which occur due to different intensities of the reflected radiation, wherein this should in particular be possible over the total dynamic range occurring in practice.

This object is satisfied in that a series connection of load resistors is connected after the receiver unit and a separate amplifier is associated with each load resistor to amplify the subsidiary pulse produced at the respective load resistor from an incoming, successively attenuated received pulse.

In accordance with the invention, a plurality of signal pulses, termed subsidiary pulses here, with a reducing signal level are produced from each receiver pulse produced at the receiver unit, with these signal pulses being amplified by an arrangement of parallel amplifiers, with a separate amplifier being associated with each subsidiary pulse. Consequently, a plurality of parallel measuring channels are available at the same time which differ in that the received pulses, that is the subsidiary pulses, are of different signal levels.

Depending on the initial signal level of a received pulse produced at the receiver unit, a subsidiary pulse is produced at one of the load resistors which is not overmodulated subsequent to its amplification; that is, its signal level remains below an overmodulating threshold. The subsidiary pulses produced at the previous load resistors before this first, non-overmodulated, amplified subsidiary pulse are subjected to a pulse widening due to their amplification which results in overmodulation which would result in inaccuracies or at least in problems in a distance measurement taking place using a pulse transit time process. The invention allows these overmodulated amplified subsidiary pulses to be suppressed and to subject a non-overmodulated amplified subsidiary pulse to a subsequent evaluation.

Since, in accordance with the invention, a plurality of measuring channels are available, provision is automatically made for a measuring channel to exist for every signal level of an initial received pulse, that is, for every intensity of a reflected radiation pulse, in which an optimum evaluation of the received pulse is possible which is free of disturbing overmodulation effects, in that it is not the initial received pulse itself which is evaluated, but a subsidiary pulse produced from this which has a reduced signal level due to the attenuation by one or more load resistors, but which still contains the information required for a distance measurement using the transit time principle.

In accordance with the invention, the initial received pulse in a certain sense, and in dependence on its signal level, itself finds that measuring channel in which it can be evaluated without problem in the form of an attenuated subsidiary pulse which is, however, particularly not falsified with respect to the required information.

An extremely wide dynamic range can consequently be covered by the invention. Both near targets with a high reflectance and far targets of low reflectivity can be measured without problem and without compromises in the accuracy and speed of the distance measurement.

The measuring device in accordance with the invention can consequently be used to particular advantage in connection with laser scanners, for example in the areas of traffic engineering, automobile sensor technology and industrial surveying, and in particular anywhere special target marks of high reflectivity should be measured, on the one hand, and normal objects or the surroundings should be measured simultaneously, on the other hand, and are scanned for this purpose. Possible applications are, for example, navigation and safety with automatic transport vehicles when reflectors of known location have to be identified for the part task "navigation" and objects with low reflectance must also not be overlooked for the part task "safety". Possible further applications are, for example, measurements on liquid metals where bare metal surfaces and dark ash regions alternate in rapid succession.

The invention moreover allows reflectivity measurements in that, with knowledge of the object distance, a conclusion is made on the intensity of the radiation pulse received, and thus on the reflectivity of the object in question, from the signal level of a non-overmodulated and therefore non-widened amplified subsidiary pulse, with the known properties of the measuring channel in question, that is, the degree of attenuation due to the respective load resistors and the characteristic values of the respective amplifier, allowing a conclusion on the signal level of the initial received pulse.

The invention can be advantageously combined with a double pulse evaluation in which received pulses successively incoming in a short time interval of the same transmitted pulse transmitted by the transmitter unit are evaluated with regard to the transit time in order, for example, to measure the upper edge of a container standing on the floor separately from the floor itself. Widenings of the received pulse due to overmodulation are avoided by the invention such that even received pulses lying close to one another in time can be separated from one another and no problems occur due to deformations or suppressions of the later received pulses by widened earlier received pulses.

Provision is preferably made for the resistance values of the load resistors to reduce in succession starting from the receiver unit.

Furthermore, the ratios of the resistance values of the load resistors to one another are preferably matched to the dynamic ranges of the amplifiers.

The matching of the resistance values to the properties, and in particular to the dynamic ranges or amplification factors of the amplifiers, preferably takes place such that a gap-free covering of the dynamic range or intensity range respectively expected in practice is ensured; that is, a distance measurement with high accuracy is ensured for all objects located within the sight distance or range of the measuring device independent of their reflectance.

It is particularly preferred for the resistance values of the working resistors to be selected such that the quotient of two sums of resistance values succeeding one another in each case corresponds to the dynamic range of the following amplifier.

The dynamic range is preferably the same for all amplifiers.

In a further preferred practical embodiment of the invention, a comparator with a pre-determined reference voltage is connected after every amplifier, the reference voltage in particular corresponding to a respective reference threshold of a downstream selection unit to which the comparators are connected.

A common selection unit is preferably connected after the amplifiers and at least one, preferably precisely one, amplified subsidiary pulse remaining below an overmodulation threshold can be selected by it from the incoming, in particular parallel incoming, amplified subsidiary pulses and forwarded by it to a downstream evaluation unit for evaluation in particular with respect to the transit time.

Provision is preferably made in this connection for the selection unit to select the smallest amplified subsidiary pulse exceeding a respective reference threshold.

In accordance with a further preferred embodiment of the invention, the selection unit is made such that every amplified subsidiary pulse exceeding a respective reference threshold suppresses the evaluation of at least one larger subsidiary pulse, in particular the next larger amplified subsidiary pulse. It is hereby achieved that only the smallest of all amplified subsidiary pulses exceeding the respective reference threshold is left over.

Further preferred embodiments of the invention are contained in the following description and in the drawing.

DESCRIPTION OF THE PREFERRED EMBODIMENTS

The optoelectronic distance measuring device in accordance with the invention is preferably a laser scanner which transmits pulsed electromagnetic radiation in one or more scanning planes into a monitored zone and receives radiation reflected from objects located in the monitored zone. A transmitter unit includes, as a radiation source, a laser diode and a radiation deflection device in the form of a rotating mirror. The sight range of such a scanner amounts up to 360°. A receiver unit includes a photodiode, in particular an avalanche photo diode (APD), for each scanning plane as a receiver. Within each scanning plane, the scanner also measures the angle with respect to a predetermined axis in addition to the distance from one or more objects (which will be examined in more detail in the following) for every direction in which a transmitted pulse is transmitted, with the distance measurement taking place using a pulse transit time process.

Figure 1:
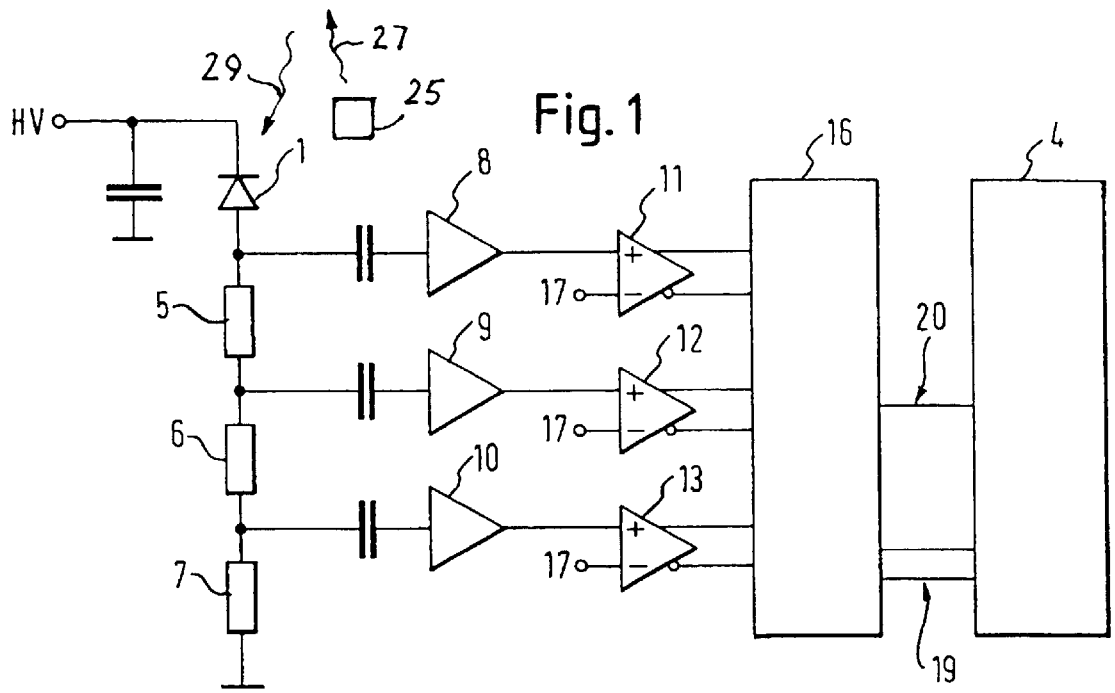
FIG. 1 is the circuit diagram for a receiver unit and an evaluation unit of an optoelectronic distance measuring device in accordance with an embodiment of the invention.

Referring to FIG. 1, a transmitter unit 25 directs pulsed electromagnetic radiation 27 to an object (not shown) which causes reflected radiation 29. A radiation pulse reflected from an object after the transmission of a transmitted pulse produces a received pulse at the photodiode 1 from which a subsidiary pulse is created at every load resistor 5, 6, 7 of a resistance series connection downstream of the photodiode 1, the subsidiary pulse being amplified by means of a capacitively coupled amplifier 8, 9, 10. A comparator 11, 12, 13 with an individually set reference voltage 17 is connected to each amplifier 8, 9, 10, said reference voltage being selected according to the signal-to-noise ratio required in the measuring channel or measuring branch in question.

The resistance values of the load resistors 5, 6, 7 reduce relative to the reference potential starting from the photodiode 1 and are matched to the dynamic ranges of the amplifiers 8, 9, 10 such that the quotient of succeeding sums of resistance values in each case corresponds to the dynamic range of the following amplifier. With a dynamic range of 1/10, for example, the resistance values are selected at a ratio of 1/10, with the larger resistance value, for example, amounting to 90 ohms and the smaller resistance value to 10 ohms.

Figure 2:
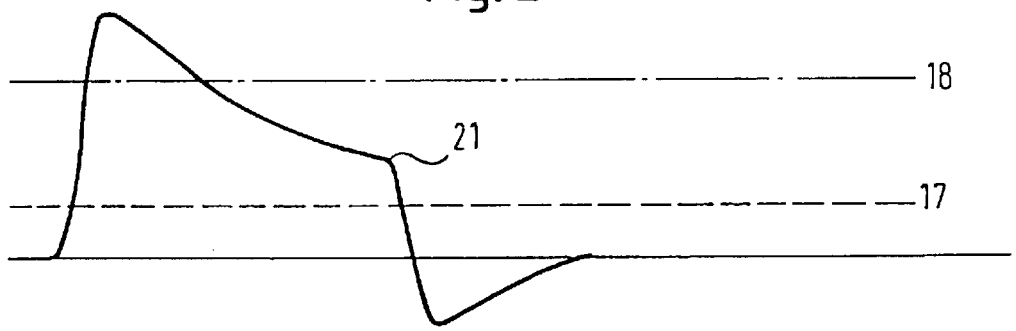
FIG. 2 amplified subsidiary pulses of a received pulse of the optoelectronic distance measuring device of FIG. 1.
Figure 2:
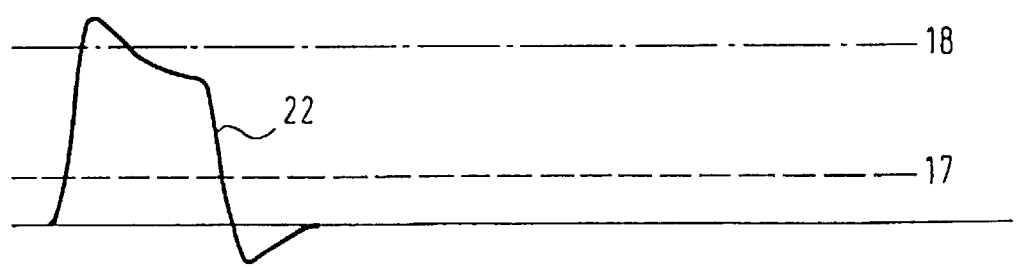
Figure 2:
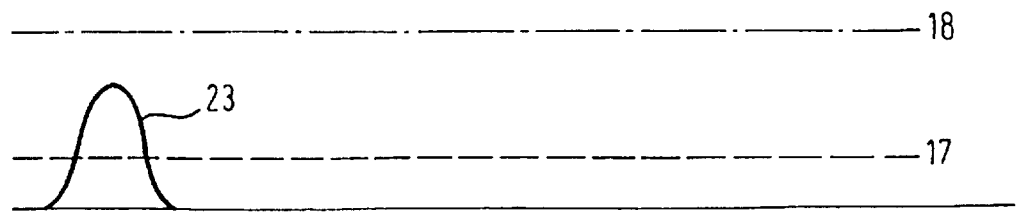

The amplified subsidiary pulses 21, 22, 23 are shown in FIG. 2, with the largest pulse 21 produced by means of the first amplifier 8 and the middle pulse 22 produced by means of the second amplifier 9 each exceeding an overmodulation threshold 18 and therefore being subjected to a widening.

The smallest pulse 23 produced by means of the third amplifier 10 exceeds the reference voltage 17, but remains below the overmodulation threshold 18 and therefore does not have any widening.

The amplified subsidiary pulses 21, 22, 23 are delivered to a common selection unit 16 which is connected to the comparators 11, 12, 13 such that every amplified subsidiary pulse 22, 23 exceeding the respective reference voltage 17 switches off the next larger pulse 21, 22 and thereby prevents its further processing.

To ensure the switching off of the respectively larger pulse 21, 22, a corresponding delay of the incoming pulses 21, 22, 23 takes place in the selection unit 16.

An evaluation of the overmodulated amplified subsidiary pulses 21, 22 is hereby prevented and only the smallest amplified subsidiary pulse 23 exceeding the respective reference threshold 17 is subjected to an evaluation with respect to the transit time, whereby a distance measurement with high accuracy is achieved.

The subsidiary pulse 23 selected in this way by means of the selection circuit 16 reaches an evaluation unit 4 via a line 20, with the distance determination taking place from the pulse transit time in evaluation unit 4.

To compensate a possibly different time behavior of the amplifiers 8, 9, 10, an individual offset value is determined for each amplifier 8, 9, 10 and stored in a memory to which the evaluation unit 4 has access.

Information on which of the amplified subsidiary pulses 21, 22, 23 is used for evaluation, that is, which of the parallel measuring channels was selected, reaches the evaluation unit 4 from the selection circuit 16 via control lines 19 such that the evaluation unit 4 can take the offset value of the amplifier 8, 9, 10 in question into account in the evaluation.

What is claimed is:

1. An optoelectronic device, for measuring the distance of objects comprising
   at least one transmitter unit to transmit pulsed electromagnetic radiation;
   at least one receiver unit, associated with the transmitter unit to receive reflected radiation;
   an evaluation unit to determine at least the distance of the objects reflecting the transmitted radiation; and
   a series connection of load resistors connected after the receiver unit and a separate amplifier associated with each load resistor to amplify a subsidiary pulse created at the respective load resistor from an incoming, successively attenuated received pulse.

2. A device in accordance with claim 1, wherein the resistance values of the load resistors reduce successively starting from the receiver unit.

3. A device in accordance with claim 1 wherein the ratios of the resistance values of the load resistors among one another are matched to the dynamic ranges of the amplifiers.

4. A device in accordance with claim 1 wherein the resistance values of the load resistors are selected such that a quotient of two successive sums of resistance values in each case corresponds to the dynamic range of the following amplifier.

5. A device in accordance with claim 4 comprising at least first, second and third successively arranged load resistors, and wherein the load resistance value of the second load resistor is selected so that the quotient of the sums of the load resistance values of the first and second load resistors corresponds to the dynamic range of the amplifier following the second load resistor.

6. A device according to claim 5 wherein the load resistance value of the third load resistor is selected so that the quotient of the sums of the load resistance values of the second and third load resistors corresponds to the dynamic range of the amplifier following the third load resistor.

7. A device according to claim 6 including a selection unit operatively coupled with the amplifier which selects the lowest amplified subsidiary pulse exceeding a reference voltage for further processing.

8. A device in accordance with claim 6 including means for using each amplified subsidiary pulse exceeding a reference voltage to switch off the next larger amplified subsidiary pulse and thereby prevent the next larger subsidiary pulse from being further processed.

9. A device in accordance with claim 1 wherein all amplifiers have the same dynamic range.

10. A device in accordance with claim 1 including a comparator with a predetermined reference voltage connected after each amplifier, the reference voltage corresponding to a respective reference threshold of a downstream selection unit connected to the comparators.

11. A device in accordance with claim 10 wherein an individual reference voltage is provided for each comparator.

12. A device in accordance with claim 1 including a common selection unit connected after the amplifiers for selecting at least one amplified subsidiary pulse from the incoming amplified subsidiary pulses which can be forwarded to a downstream evaluation unit for evaluation.

13. A device in accordance with claim 12 wherein a smallest amplified subsidiary pulse exceeding a respective reference threshold can be selected by the selection unit.

14. A device in accordance with claim 12 wherein the selection unit is made such that every amplified subsidiary pulse exceeding a respective reference threshold suppresses the evaluation of at least one larger amplified subsidiary pulse.

15. A device in accordance with claim 1 comprising a laser scanner.

16. A device in accordance with claim 14 wherein the selection unit suppresses a next larger, amplified subsidiary pulse.

17. A device according to claim 12 wherein the incoming amplified subsidiary pulses comprise parallel pulses.

18. A device according to claim 12 wherein the downstream evaluation unit evaluates a transit time of the subsidiary pulse.

19. A device in accordance with claim 1 wherein the at least one receiver unit comprises a photodiode.

20. A device in accordance with claim 1 wherein the evaluation unit uses a pulse transit time process.

21. A device according to claim 12 wherein the common selection unit is adapted to select precisely one amplified subsidiary pulse remaining below an overmodulation threshold.

* * * * *